May 15, 1962 H. REICHERT 3,035,187

PULSE PICK-OUT SYSTEM

Filed Sept. 15, 1959 2 Sheets-Sheet 1

INVENTOR.

HUGO REICHERT

BY Toulmin & Toulmin

Attorneys

May 15, 1962 H. REICHERT 3,035,187

PULSE PICK-OUT SYSTEM

Filed Sept. 15, 1959 2 Sheets-Sheet 2

INVENTOR
HUGO REICHERT

BY Toulmin & Toulmin
ATTORNEYS

United States Patent Office 3,035,187

Patented May 15, 1962

3,035,187
PULSE PICK-OUT SYSTEM

Hugo Reichert, Wilhelmshaven, Germany, assignor to Olympia Werke Aktiengesellschaft, Wilhelmshaven, Germany Filed Sept. 15, 1959, Ser. No. 840,194
4 Claims. (Cl. 307—88.5)

The present invention relates to an electronic circuit network for producing control and switching pulse-groups or sequences. More in particular, the present invention relates to an electronic system as described in my co-pending application Serial Number 752,102, and which serves to pick out pulse groups or sequences of given length from a continuous sequence of equally spaced electrical pulses, which pulse groups are comprised of a determined number of pulses appearing at predetermined sequence. The picked-out pulse sequence is applied to an output terminal.

Hitherto, when it became necessary to make certain desired pulse groups available at predetermined times in order to control the individual operations of electrical accounting or computing machines processing data in the form of electrical pulses, the desired pulse groups must be produced by pulse generators which are in turn set in operation by means of an extraneous starting pulse. Thus, Patent 2,418,521 to Martin et al. describes a pulse measuring device in which an oscillator generates pulses which are converted to a desired shape by pulse deforming means and are then amplified. An electronic counter connected directly to the output of the amplifying means of this known device, counts the pulses and interrupts their transmission, as soon as the desired number of pulses has been picked out.

The known methods of producing pulse groups suffer from the drawback of making the synchronization in correct phase of the group pulses produced by the pulse generator with the working clock pulses of the computing or the like machine very difficult. This fact requires special means for enforcing synchronization in particular when using several pulse generators; furthermore, the instant in which the pulse generator is set in operation for transmission is in no exactly definable time relation to the pulses which the generator itself produces.

As a further drawback, each pulse group required in the computing machine or the like must be produced by a pulse generator of its own, requiring in addition electronic counters which cause an unduly large outlay in tubes, etc., in particular if pulse groups having a high pulse number are required.

In my co-pending application Serial Number 752,102 I have suggested to overcome these various disadvantages by providing a pulse pick-out arrangement in which a group of pulses from the continuous clock pulse sequence, for instance of a machine of the type described above, is picked out during a determined time interval between two switching pulses having a determined distance in time from each other, and branching off the desired pulse group to an output terminal, where this pulse group is made available. The switching pulses are introduced as a continuous pulse sequence, preferably at a lower frequency than that of the clock pulse sequence, on a channel of the arrangement according to my invention.

More particularly, the invention of application Serial Number 752,102 is characterized by a gating arrangement in which a first switching pulse of a single switching pulse sequence following a special starting pulse, given at will, opens the gate and branches off the clock pulses for such time until the next following switching pulse of the aforesaid sequence interrupts the pick-out of the clock pulses, whereupon a later switching pulse of the above-mentioned sequence can only open the gate for branching off another clock pulse sequence after a renewed occurrence of a command for doing so, in the form of another special starting pulse.

In accordance with a primary object and advantage of the present invention, after a reset pulse has been applied, only one train of clock pulses need to be applied to a single, main input terminal of the new electronic network. This network is designed so that switching pulses appear in periodically repeated groups at the main output terminal of the network and in synchronism with the pulses of the train of clock pulses.

According to a further advantage of the invention it is possible to connect to a single source of clock pulses to several networks designed in accordance with the invention, so that in a very simple manner different groups of switching pulses or of sequences thereof are obtained, whereby all pulses occur in synchronism to the clock pulses. These switching pulse sequences must be available constantly and unchanged for the various operations of the particular machine. For these reasons I have found it to be of particular advantage to control the pulse pick-out gate of the switching arrangement by switching pulses produced in the switching arrangement proper, rather than effecting this control by an externally produced switching pulse sequence which is then fed into the switching arrangement.

It is thus the primary object of this invention to devise an electronic circuit network, in which a gate circuit is controlled by pulses produced in the network, so that groups of pulses and of given length appear at the output terminal of the gate, which groups of pulses are each comprised of regularly or irregularly spaced switching pulses appearing in synchronism with clock pulses.

The object of the invention is attained in utilizing the clock pulses in the electronic network for producing the switching pulses for the gate.

The network thus comprises a series of bistable switching stages and in accordance with the invention, each switching stage includes an input terminal and two output terminals, and it further includes means for dividing-by-two the frequency of a train of pulses appearing at its input terminal so that two pulse trains of similar frequency but in phase opposition and at half the input pulse frequency appear respectively at the two output terminals.

The first switching stage of this series of elements receives the clock pulses; thus, the frequency of the clock pulses is divided by two in this first stage and pulse trains of half the clock pulse frequency appear respectively at the two output terminals thereof.

The input terminal of the second stage is connected to one of the output terminals of the first stage. Basically it is not important which one of the output terminals is connected to the second stage. Normally, one will make the connection in such a manner that the second stage is enabled to further divide the frequency by two so that at the output terminals of this second stage pulse trains appear having a frequency of a quarter of the clock pulse frequency. Again, the pulse trains at the two output terminals are in phase of opposition.

There can be provided additional switching stages of similar design as the two referred to above. The number of stages employed depends upon the length of groups of switching pulses to be produced. It will be appreciated that the several pulses appearing at the output terminals of the several switching stages can be used to control the gate. In accordance with the invention, this gate has one output terminal and several input terminals; one input terminal thereof is connected to the source of clock pulses; other input terminals of the gate are individually connected to output terminals of the switching stages, with, at most, one output terminal of a switching stage being connected to an input terminal of the gate. Every desired pulse pattern can thus be derived from the output terminal of the gate.

Reset means for all of the switching stages may be provided to place all of them into an initial state.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

The invention is shown in the afore-mentioned drawing and will next be described by means of the particular example of a so-called 00LL generator wherein 0 means "no pulse" and L designates a pulse. It will of course be understood that this example is not to be considered as limitative of the applicability or usefulness of the invention.

It is the purpose of such an 00LL generator to produce a pulse sequence for particular problems in the calculating operations of a computing machine. The pulse sequence produced by the generator has the duration equivalent to four clock pulses and it consists of the following combination of pulses: 0=no pulse—0=no pulse—L=pulse—L=pulse.

Figures 1, 3:
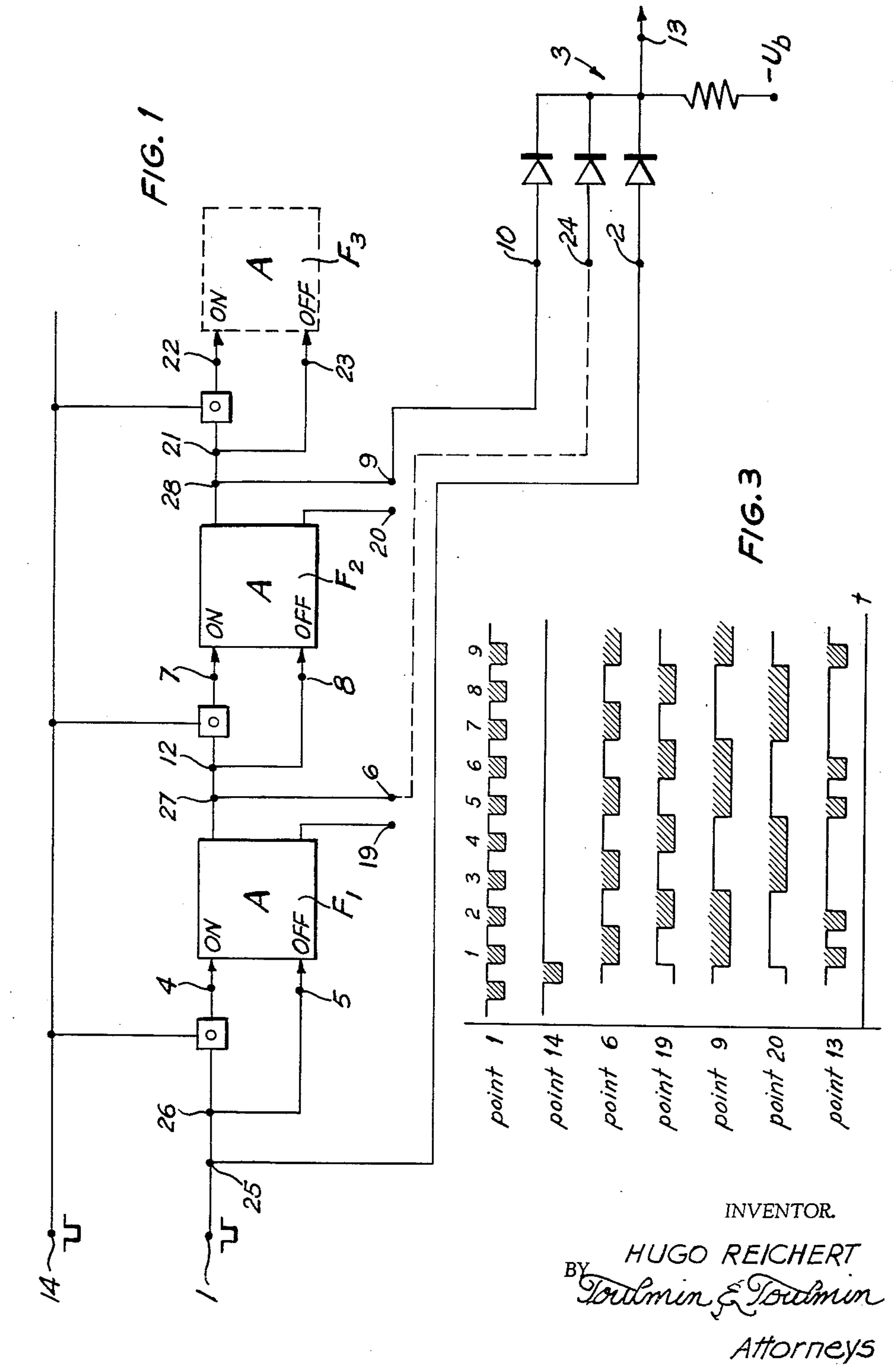
FIGURE 1 is a block diagram of a pulse pick-out system for periodically recurring pulse sequences of the invention.
FIGURE 3 shows graphically a pulse plan of the switching system according to the invention as shown in FIGURE 2.

The circuit system according to the invention as shown in FIG. 1 will next be described. The gate 3 is an "and" circuit. "And" circuits are described, for instance, in "High Speed Computing Devices" (McGraw Hill Book Company, 1950), pages 37–43. The gate 3 has input terminals 2, 10 and 24 and an output terminal 13. As will be explained below, there can be provided additional input terminals for the gate without changing the crux of the invention. There are provided two similar bistable switching elements or stages $F_1$ and $F_2$. The number of switching stages or switching elements can be increased because the number of elements is not critical with regard to the invention as long as there are at least two switching stages.

The switching elements are connected so as to define a frequency divider. Element $F_1$ has an input terminal 26 and two output terminals 6 and 19. The second switching element $F_2$ has an input terminal 27 and two output terminals 9 and 20.

The two switching elements include similar flip-flop circuit networks. The flip-flop circuit of element $F_1$ has two input terminals 4 and 5 which are both connected to the input terminal 26 of this first stage. There is one branch of a logic "or" circuit 11 interposed between terminals 26 and 4, with the output terminal of this logic "or" circuit 11 being joined with terminal 4, and terminal 26 thus constituting one input terminal thereof. Terminal 4 is labelled "on" and terminal 5 is labelled "off." This is an arbitrary but convenient designation which defines that if a "flipping" pulse has flipped element $F_1$ from terminal 4 the switch is considered to be in its "on" state while a pulse flipping element $F_1$ at terminal 5 places the switch in "off" state. Such designation is convenient to provide for an adequate comparison among the several switching elements.

The input terminal of the second stage $F_2$ is connected to output terminal 6 of stage $F_1$. This connection is not mandatory, and there may instead be a connection made between terminals 27 and 19; but there must not be any other inter-connection between stages $F_1$ and $F_2$.

The flip flop of stage $F_2$ has two input terminals 7 and 8 both being connected to common input terminal 27, whereby there is interposed between terminals 27 and 8 one branch of a logic "or" circuit 12 with the output terminal thereof being placed at 8.

From FIG. 1 one can see how a third stage $F_3$ may conveniently be connected to stage $F_2$, which connection is to be made in exactly the same manner as stage $F_2$ is connected to stage $F_1$. Correspondingly, there would be an "or" circuit 21 interposed between terminals 28 and 22.

The respective other branches or input terminals of all "or" circuits are connected to a common input terminal 14 for applying reset pulses to all the stages. The flip-flop $F_1$ comprises two p-n-p transistors 15, 16, and the flip-flop $F_2$ comprises two p-n-p transistors 17 and 18. The "and" circuit forming gate 3 comprises three diodes, the "or" circuits 11 and 12 also consist each of a pair of diodes (see FIG. 2). Furthermore, there are provided a terminal 1 for the clockpulse, and an input terminal 14 for a starting pulse.

Input terminal 2 of gate 3 is connected to main input terminal 1 via a terminal 25. There are clock pulses applied to main input terminal 1.

There are further provided connection means interconnecting respective output terminals of the several stages, but not more than one connection for the stages $F_2$, $F_3$ etc., to one or more of the input terminals 10, 24 etc.

The mode of connection depends (see infra) on the particular switching pulse combination which is desired to be derived from main output terminal 13.

In the instant case, terminal 9 is shown as being connected to terminal 10. The following explanation of the mode of operation assumes two switching stages or elements, but one skilled in the art can readily supplement the network as described with further stages to be connected as outlined in accordance with the general rule of the invention.

*Operation*

The operation of a pulse pick-out system according to the invention will next be described with reference to FIGURES 2 and 3. However, since the operation of a transistor-flip-flop is known in the art, only the operation of the flip-flops in connection with the circuit system of the invention will be described.

It is assumed that the left-hand transistors 15 and 17 of the flip-flops $F_1$ and $F_2$, respectively, are in a conductive state. This means that the points 6 and 9 of the flip-flops $F_1$ and $F_2$ have positive potential relative to the negative collector voltage of the p-n-p-transistor. The right-hand diode of the "and" circuit 3 is conductive and there is no impulse at the output 13 of gate 3. As soon as the first negative clock pulse reaches the points 4 and 5 of $F_1$, coming from point 1, transistor 15 does not respond, whereas the heretofore blocked transistor 16 is made conductive. Consequently, the flip-flop $F_1$ changes to its second stable state and a negative potential appears simultaneously at the output 6 of $F_1$ as well as at the inputs 7 and 8 of flip-flop $F_2$. The negative shock-voltage turns on transistor 18 via input 8 and changes flip-flop $F_2$ to its second stable state. The potential at output 9 of $F_2$ then drops and the input 10 of the "and" circuit or gate 3 receives negative potential. Thereby, the gate has been opened for the negative clock pulses at input 2, and the first clock pulse can be obtained at output 13.

Under the influence of the second negative clock pulse reaching the inputs 4 and 5 coming from point 1 the flip-flop $F_1$ is returned to its initial position and the output terminal 6 thus receives a positive potential. Flip-flop $F_2$ retains its position maintained during the first clock pulse, thereby keeping opened gate 3 at input 2 for the second clock pulse.

The third clock pulse changes flip-flop $F_2$ again to its second stable position. Thereafter, the negative potential at output 6 returns flip-flop $F_2$ to its initial position, thereby blocking gate 3 for the following two clock pulses.

Upon any change of the potential or voltage level at terminals 6 and 9, also the respective potentials of voltage levels of terminals 19 and 20 alter in opposite direction. It is apparent that the potentials at terminals 6 and 19 alternate between two respective levels and in opposition to each other. Also, the potentials at terminals 9 and 20 alternate between two respective levels and in opposition to each other, and the connection between the two stages $F_1$ and $F_2$ is such that the frequency of such potential alternation at terminals 6 and 19 is twice the frequency of the potential alternation at terminals 9 and 20. The frequency of the clock pulses in turn is twice that at terminals 6 and 19. If a stage $F_3$ were used, there would be a further frequency division.

Figure 2:
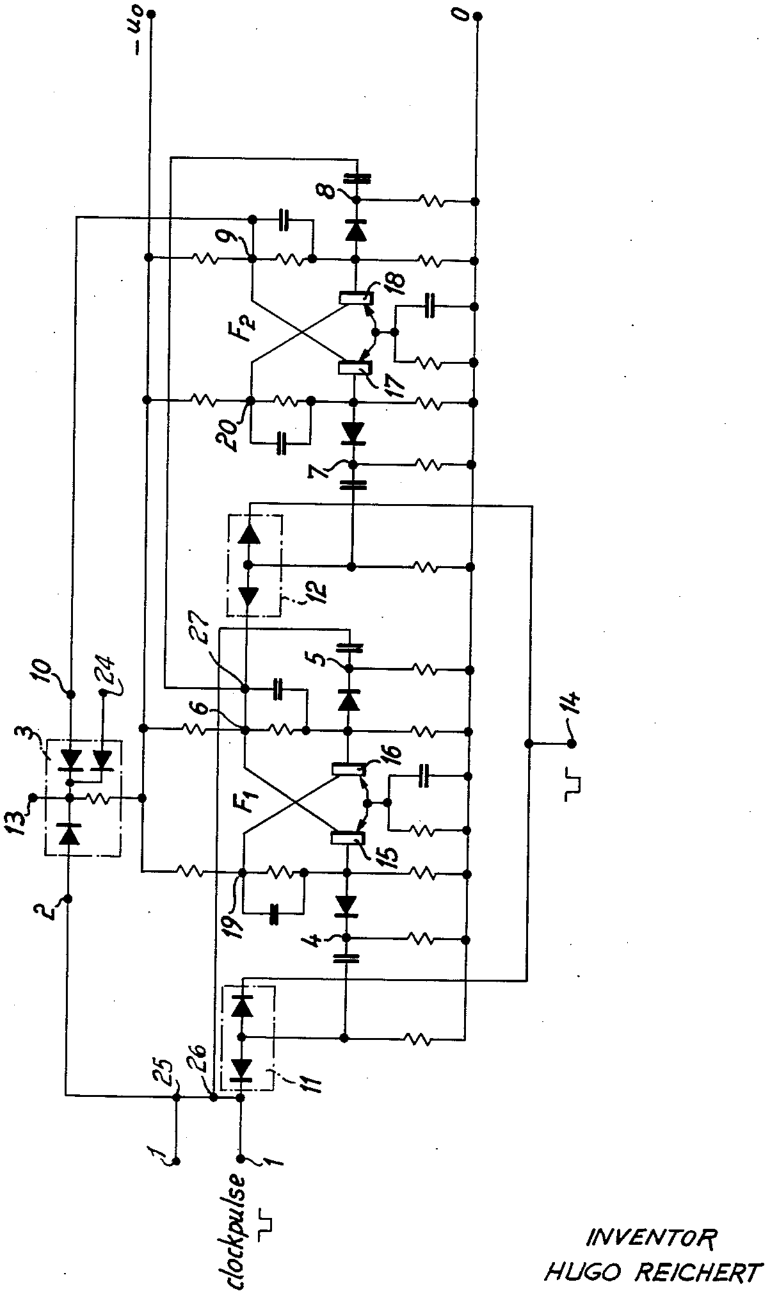
FIGURE 2 shows an embodiment of the invention in which transistor flip-flops are used.

As one can see from FIG. 2, gate 3 permits passage of clock pulses from terminal 2 to the main output terminal 13 whenever the potential at terminal 9 is negative with respect to the potential at terminal 20. This negative potential is effective at terminal 10 thus opening the gate.

In the example described, a pulse sequence LL00 appears at terminal 13. This group of pulses will be repeated periodically as long as the network is in operation.

Before starting the production of the pulse sequences the flip-flops must be brought into the necessary initial position. For that purpose it is necessary to produce a reset pulse. This is done by connecting inputs 4 and 7 of flip-flops $F_1$ and $F_2$, respectively, via the "or" circuits 11 and 12, respectively, with the input terminal 14. If the transistors 15 and 17 are blocked and if, consequently, the flip-flops $F_1$ and $F_2$ are in their respective second stable state, the transistors are unblocked, that is, made conductive, by the negative reset pulse at the inputs 4 and 7, whereby the flip-flops are brought into the correct initial position. The first clock pulse following this reset pulse then initiates the production of the desired pulse combination as described above.

The invention is not to be considered as limited by the aforedescribed example. The circuit system of the invention is also susceptible to branching-off other periodically recurring pulse combinations synchronously with the clock pulses, as used in electronic computers and the like devices requiring a variety of pulse combinations. Thus it is possible, for example, to modify the "and" circuit by adding a further input comprising for instance, a third diode with input terminal 24 or a third control grid of a control tube. The picked-out pulses are then combined with two of the four outputs of the flip-flops, according to the desired pulse sequence. The combination to be used can be easily obtained from the pulse plan of FIG. 3 indicating the change of potentials of the four outputs 6, 19, 9, 20 of the flip-flops. If for example the pulse sequence L—0—0—0 is wanted, the three inputs of the "and" circuit must be connected with the clock pulses and with the outputs 6 and 9 of flip-flops $F_1$ and $F_2$, respectively.

If the pulse sequence L0L0 is desired, one has to connect terminal 10 of gate 3 to terminal 6 (no connection for terminal 24).

If terminal 19 is connected to terminal 10, and again no connection is made to terminal 24, then a pulse sequence 0L0L appears at terminal 13.

If terminal 20 is connected to terminal 10 and terminal 19 to terminal 24, the pulse sequence 000L is produced.

Upon supplementing the circuit network as disclosed by one or more switching stages and by one or more corresponding input terminals for gate 3 it is possible to provide for a considerable number of pulse combinations at main output terminal 13.

It will be understood that this invention is susceptible to modification in order to adapt it to different usages and conditions and, accordingly, it is desired to comprehend such modifications within this invention as may fall within the scope of the appended claims.

What I claim is:

1. Electronic circuit network for producing pulse sequences with the individual pulses thereof running in synchronism with a pulse of a train of clock pulses comprising: a gate having a plurality of input terminals and an output terminal; a plurality of similar bistable switching elements, each element having an input terminal and two output terminals, at each stable state one of said output terminals being at a first voltage level, the other output terminal being at a second voltage level, with said output terminals each alternating between said two levels upon application of a given voltage level to said input terminal, there being a first switching element and at least one succeeding switching element including a last switching element; means for connecting one output terminal of each switching element except of said last element, to the input terminal of a succeeding switching element, with the input terminal of any but said first switching element being connected to one output terminal only, so that the frequency of alternation between said two levels at the output terminals of each switching element is half of the corresponding frequency of the preceding elements; means for connecting one output terminal of each switching element individually to input terminals of said gate; means including a main input terminal connected for applying a train of clock pulses to the input terminal of said first element; means for connecting said main input terminal to a further one of said input terminals of said gate; and resetting means common to all switching elements.

2. Electric circuit network for producing pulse sequences with the individual pulses thereof running in synchronism with a train of clock pulses, comprising: a gate having a plurality of input terminals and an output terminal; means including a main input terminal connected for applying a train of clock pulses to a first one of said input terminals of said gate; a first bistable flip flop having two input terminals both connected to said main input terminal and having two output terminals, the voltage levels thereof alternating oppositely between two different levels at the application of each clock pulse; a first logic "or" element having two input terminals and being with one input terminal and its output terminal respectively interposed between said main input terminal and one of said input terminals of said first flip flop; at least one other, similar bistable flip flop having two input and two output terminals, a further logic "or" circuit for each of said other flip flops, each having two input terminals and having its output terminal respectively connected to one input terminal of a bistable flip flop; means for interconnecting one input terminal of said logic further "or" circuit and the other input terminal of the respective flip flop, so as to form a common input terminal thereof, circuit means for connecting the common input terminal of a flip flop of said other flip flop to one output terminal of another flip flop as to form a chain of succeeding flip flop stages including said first flip flop as first stage, with each flip flop alternating between its two stable states at a frequency half of that of the preceding stage; circuit means for connecting one output terminal of each flip flop individually to other input terminals of said gate; and means connected to the remaining input terminals of said logic "or" circuit for resetting all of said flip flops to a predetermined state.

3. Circuit network as set forth in claim 2, there being a common line interconnecting all of said other input terminals of said logic "or" circuits.

4. Electric circuit network for producing pulse sequences with the individual pulses thereof running in synchronism with a train of clock pulses, comprising a gate having a plurality of input terminals and output terminals; means including a main input terminal connected for applying a train of clock pulses to a first one of said input terminals of said gate; a first bistable flip flop having two input terminals both connected to said main input terminal and having two output terminals, the voltage levels thereof alternating oppositely between two different levels at the application of each clock pulse; a first logic "or" element having two input terminals and being with one input terminal and its output terminal respectively interposed between said main input terminal and one of said input terminals of said first flip flop; at least one other similar bistable flip flop having two input and two output terminals with at least a further logic "or" circuit for each of said other flip flops having two input terminals and having its output terminal respectively connected to one input terminal of a bistable flip flop; means for interconnecting one input terminal of said further logic "or" circuit and the other input terminal of the respective flip flop, so as to form a common input terminal thereof; circuit means for connecting the common input terminal of a flip flop of said other flip flops to one output terminal of another flip flop as to form a chain of succeeding flip flop stages including said first flip flop as first stage, with each flip flop alternating between its two stable states at a frequency half of that of the preceding stage; circuit means for connecting one output terminal of at least one flip flop including an output terminal of the last stage but of less than of all flip flops, individually to other input terminals of said gate; resetting means; and means interconnecting said resetting means and all of said remaining input terminals of said logic "or" circuits for resetting all of said flip flops to a predetermined state.

References Cited in the file of this patent

UNITED STATES PATENTS

| | | |
|---|---|---|
| 2,574,145 | Freas | Nov. 6, 1951 |
| 2,868,455 | Bruce et al. | Jan. 13, 1959 |
| 2,869,000 | Bruce | June 13, 1959 |
| 2,903,606 | Curtis | Sept. 8, 1959 |

OTHER REFERENCES

Mandl: "Fundamentals of Digital Computers," published by Prentice-Hall, Inc., Englewood Cliffs, N.J., 1958.

Richards: "Arithmetic Operation in Digital Computers," published by Van Nostrand, N.Y. 1955 (FIGURES 7-3, 7-4).